Patented Feb. 20, 1951

2,542,177

UNITED STATES PATENT OFFICE 2,542,177

MANUFACTURE OF CHROMIUM STEELS

Robert M. Briney, Douglaston, N. Y., assignor to Union Carbide and Carbon Corporation, a corporation of New York No Drawing. Application June 25, 1949, Serial No. 101,493

4 Claims. (Cl. 75—130.5)

This invention relates to the manufacture of chromium-bearing steels of low carbon content and has for its primary object an improved process for manufacturing such steels, and particularly steels containing more than 12% chromium.

Conventionally, in the manufacture of steels containing more than 12% chromium, an open arc furnace is used. Into such a furnace is placed a charge containing chromium-bearing scrap, plain steel scrap, and if the steel is to contain nickel, nickel-bearing material. The charge is melted to form a liquid bath to which is added oxygen, either as a solid oxidant such as iron oxide or nickel oxide; or as gaseous oxygen or air, for the purpose of decreasing its carbon content. Along with the carbon, much of the chromium and some of the iron originally charged are also oxidized, and at the end of the oxidizing period, the chromium and iron oxides so formed are present in a slag which lies on the top of the liquid metal bath. To recover the chromium values from this slag it is necessary to add reducing agents to it, such agents as silicon-bearing alloys or aluminum being conventionally used. Such agents reduce the major part of the chromium and iron oxides to the metallic state and allow them to be redissolved in the metal bath. Upon the completion of the reduction step, the slag is poured off the metal bath, and a second slag, reducing or neutral in character, is formed on the bath to protect it from further oxidation, conventionally by the addition of such materials as lime and sand. After the formation of this second slag, additional chromium, in the form of low-carbon ferrochromium, is added to the bath until the molten steel contains the desired proportion of chromium. Minor alloying additions are made, the bath is then finally deoxidized, and the steel is tapped.

The steps of reducing chromium oxide from the first oxidizing slag, the removal of this slag, and the formation of the second, reducing or neutral slag represent a costly and time-consuming portion of the total steel heat time. The materials for the reduction are relatively expensive, power must be applied to the furnace throughout the entire period, and considerable time is required to carry out the sequence of operations. Moreover, once the bath is deoxidized under the reducing or neutral slag, the molten metal is especially prone to pick up carbon from the furnace electrodes and the materials added in the finishing stage of the heat. This tendency to pick up carbon makes it difficult to manufacture very low carbon steels, for instance steels containing 0.04% maximum carbon.

In accordance with the present invention the steel-making process is considerably shortened by employing a special kind of ferrochromium containing a critical proportion of silicon for the final chromium addition. The silicon content of this special ferrochromium acts to reduce the chromium and iron oxides from the slag at the same time that the chromium of the alloy is being assimilated by the molten bath of steel. By shortening the total time necessary to make a unit quantity of steel, daily production may be increased and the unit cost of the chromium steel decreased. Additionally the invention lessens the difficulty of manufacturing very low carbon chromium steels in the electric furnace by shortening the time the molten steel bath is held in the furnace.

In the practice of the invention a furnace is charged in conventional manner, and the charge is melted as usual. The molten bath so produced is oxidized to decrease its carbon content to the desired level. At the end of the oxidizing period there is in the furnace a molten bath of chromium-bearing steel of low carbon content covered with a slag containing relatively large quantities of chromium and iron oxides. It is at this point in the steel-making process that the improvement of the invention begins.

In the method of this invention instead of reducing the oxidized chromium and iron from the slag covering the bath of molten steel by the addition of reducing agents and then discarding the slag in the usual manner, there is added to the bath in the furnace a low carbon ferrochromium containing about 0.01% to 0.15% carbon, 50% to 70% chromium, and 5% to 15% silicon. This material has a lower melting point and goes into solution in the molten steel more quickly than the conventional low carbon ferrochromium of commerce which usually contains less than 1% silicon. At the same time that the chromium content of the bath is being raised by the solution in it of the chromium of the special ferrochromium, the silicon that is introduced reacts with the oxides in the slag, reducing them to the metallic state and permitting their solution in the bath. Thus adjustment of the chromium content of the molten steel and reduction of the slag occurs concurrently in the method of the invention.

The quantity of special ferrochromium added to the bath of molten steel in the method of this invention is determined both by the proportion of chromium desired in the steel being manufactured and by the quantity of oxide in the slag to be reduced. Generally, it is desirable that less than the amount of silicon theoretically required to reduce all the oxide in the slag be added as the special ferrochromium and that any deficiency in silicon be made up by adding silicon-bearing alloys as reducing agents. The addition of 75% to 95% of the theoretically required amount of silicon by means of the special ferrochromium is usually most desirable. By proper choice of the silicon content of the special ferrochromium, no more than the amount of silicon necessary for reduction of the oxide in the slag is introduced, and the silicon content of the molten metal is not excessively increased even when large quantities of the special ferrochromium are required for the addition of the desired quantity of chromium to the molten steel.

To obtain the maximum possible efficiency of the method of the invention, it is desirable that the oxide-containing slag be partially reduced and rendered more fluid by the addition to it of conventional silicon-bearing alloys and lime before the addition of the special ferrochromium.

In any event, in the method of the invention, after the addition of chromium by the special ferrochromium is complete, minor alloying additions may be made, the bath deoxidized, and the heat tapped. There is no necessity for removing the reduced slag and replacing it with a second slag as in conventional practice.

The method of the invention makes possible an important saving in time in the manufacture of chromium steels. Further, it minimizes the pick-up of carbon by the molten steel during the final stages of the heat, and achieves both of these improvements while decreasing the quantity of reducing agents ordinarily used in recovering chromium from the oxidizing slag in the conventional two-slag process.

The advantages of the method of the invention are clearly evident from comparison of the manufacturing logs of heats of steel made in the conventional manner with the logs of heats made after the manner of the invention. The following tabulation of data observed in the manufacture of two 2000 pound heats, "Heat I" being made in conventional manner, and "Heat II" being made in accordance with the invention is typical.

|  | Heat I | Heat II |
| --- | --- | --- |
| Quantity of chromium charged in pounds | 228 | 221 |
| Composition of bath at end of oxidizing period: | | |
| Per Cent Carbon | 0.05 | 0.05 |
| Per Cent Chromium | 8.1 | 7.9 |
| Quantity of unoxidized chromium in pounds | 155 | 150 |
| Percentage of charged chromium oxidized | 32 | 32.2 |
| Quantity of Special Ferrochromium [1] added in pounds | 0 | 384 |
| Quantity of Regular Ferrochromium [2] added in pounds | 324 | 0 |
| Quantity of 75% Si ferrosilicon to reduce slag-pounds | 60 | 20 |
| Quantity of materials to form second slag-pounds: | | |
| 75% Si ferrosilicon | 5 | 0 |
| Sand | 30 | 0 |
| Lime | 85 | 0 |
| Time from end of oxidizing period to tap-minutes | 132 | 72 |
| Analysis of finished steel: | | |
| Per Cent Carbon | 0.06 | 0.04 |
| Per Cent Chromium | 18.3 | 18.1 |

[1] Approximate composition of special ferrochromium: 60% Cr; 8% Si; 0.02% C; rest Fe.
[2] Approximate composition of regular ferrochromium: 70.5% Cr; 1% Si; 0.05% C; rest Fe.

It will be seen from the above comparison that the method of the invention provided a saving in time of 60 minutes, a saving in ferrosilicon of 45 pounds, a saving in sand of 30 pounds, and a saving in lime of 85 pounds. Moreover, there was no carbon pick-up in the steel made according to the invention, whereas the steel made in accordance with conventional practice picked up 0.01% carbon between the end of the oxidizing period and the tap.

I claim:
1. In the manufacture of chromium-bearing steel the improved method which comprises forming a bath of molten steel containing chromium; oxidizing such bath to remove carbon therefrom and forming a slag containing chromium oxide and iron oxide; adding to such slag a ferrochromium containing 50% to 70% chromium and 5% to 15% silicon to reduce said chromium and iron oxides and to permit their solution in said bath while at the same time enriching said bath in chromium; adjusting the composition of said bath by alloying additions; deoxidizing said bath; and tapping.

2. In the method of manufacturing chromium-bearing steel which comprises forming a molten bath of steel containing chromium; oxidizing such bath to remove carbon therefrom and forming a first slag containing chromium and iron oxides; reducing such chromium and iron oxides from such slag; and then removing such slag and formulating a second, non-oxidizing slag on said bath and increasing the chromium content of said bath by the addition of ferrochromium thereto, the improvement which comprises adding to said first slag a ferrochromium containing 50% to 70% chromium and 5% to 15% silicon, thus reducing said chromium and iron oxides therefrom and permitting their solution in said bath while at the same time increasing the chromium content of said bath, thus obviating the necessity for removing said first slag and forming said second slag.

3. In the method of manufacturing chromium-bearing steel which comprises forming a molten bath of steel containing chromium; oxidizing such bath to remove carbon therefrom and forming a first slag containing chromium and iron oxides; reducing such chromium and iron oxides from such slag; and then removing such slag and formulating a second, non-oxidizing slag on said bath and increasing the chromium content of said bath by the addition of ferrochromium thereto, the improvement which comprises adding to said first slag a ferrochromium containing 50% to 70% chromium and 5% to 15% silicon, said ferrochromium being added in a quantity 75% to 95% of that theoretically required to reduce all of said chromium oxide and iron oxide, thus reducing said oxides from said slag and permitting their solution in said bath while at the same time increasing the chromium content of said bath, and, separately adding a silicon-bearing material in a quantity sufficient to reduce any unreduced chromium oxide and iron oxide, thus obviating the necessity for removing said first slag and forming said second slag.

4. In the method of manufacturing chromium-bearing steel which comprises forming a molten bath of steel containing chromium; oxidizing such bath to remove carbon therefrom and forming a first slag containing chromium and iron oxides; reducing such chromium and iron oxides from such slag; and then removing such slag and formulating a second, non-oxidizing slag on said bath and increasing the chromium content of said bath by the addition of ferrochromium thereto, the improvement which comprises adding to said first slag a silicon-bearing material and lime to reduce a portion of said chromium and iron oxides and to render said slag fluid, and then adding to said first slag a ferrochromium containing 50% to 70% chromium and 5% to 15% silicon, said ferrochromium being added in an amount sufficient to complete the reduction of said chromium oxide and iron oxide from said slag while at the same time increasing the chromium content of said bath, thus obviating the necessity for removing said first slag and forming said second slag.

ROBERT M. BRINEY.

REFERENCES CITED

The following references are of record in the file of this patent:

UNITED STATES PATENTS

| Number | Name | Date |
|---|---|---|
| 2,290,194 | Linz | July 21, 1942 |
| 2,303,991 | Feild | Dec. 1, 1942 |
| 2,375,291 | Doom | May 8, 1945 |